United States Patent

[11] 3,566,156

| | | |
|---|---|---|
| [72] | Inventor | Herbert C. Loewer<br>San Diego, Calif. |
| [21] | Appl. No. | 655,839 |
| [22] | Filed | July 25, 1967 |
| [45] | Patented | Feb. 23, 1971 |
| [73] | Assignee | Ryan Aeronautical Co.<br>San Diego, Calif. |

[54] GATE INITIATED PULSE SHAPING CIRCUIT
8 Claims, 1 Drawing Fig.

[52] U.S. Cl. .................................................. 307/249,
307/259, 307/268, 343/7.3
[51] Int. Cl. ...................................................... G01s 9/02,
H03k 17/00
[50] Field of Search .......................................... 343/7.3;
307/249, 235, 253, 259, 268

[56] References Cited
UNITED STATES PATENTS

| | | | | |
|---|---|---|---|---|
| 2,927,411 | 3/1961 | Goodrich | | 307/235 |
| 3,014,182 | 12/1961 | Shallon | | 343/7.3 |
| 3,118,109 | 1/1964 | Rabow | | 343/7.3 |
| 3,249,935 | 5/1966 | Follen | | 343/7.3 |
| 3,328,796 | 6/1967 | Follen et al. | | 343/7.3 |

*Primary Examiner*—Donald D. Forrer
*Assistant Examiner*—David M. Carter
*Attorney*—Carl R. Brown ABSTRACT: This gated initiated pulse shaping circuit provides a high speed, low power, constant minimum time delay circuit that provides a spike-shaped output pulse corresponding to the leading edge of an input video echo radar pulse when the input pulse exceeds a given threshold level in coincidence with a pulse from a tracker circuit.

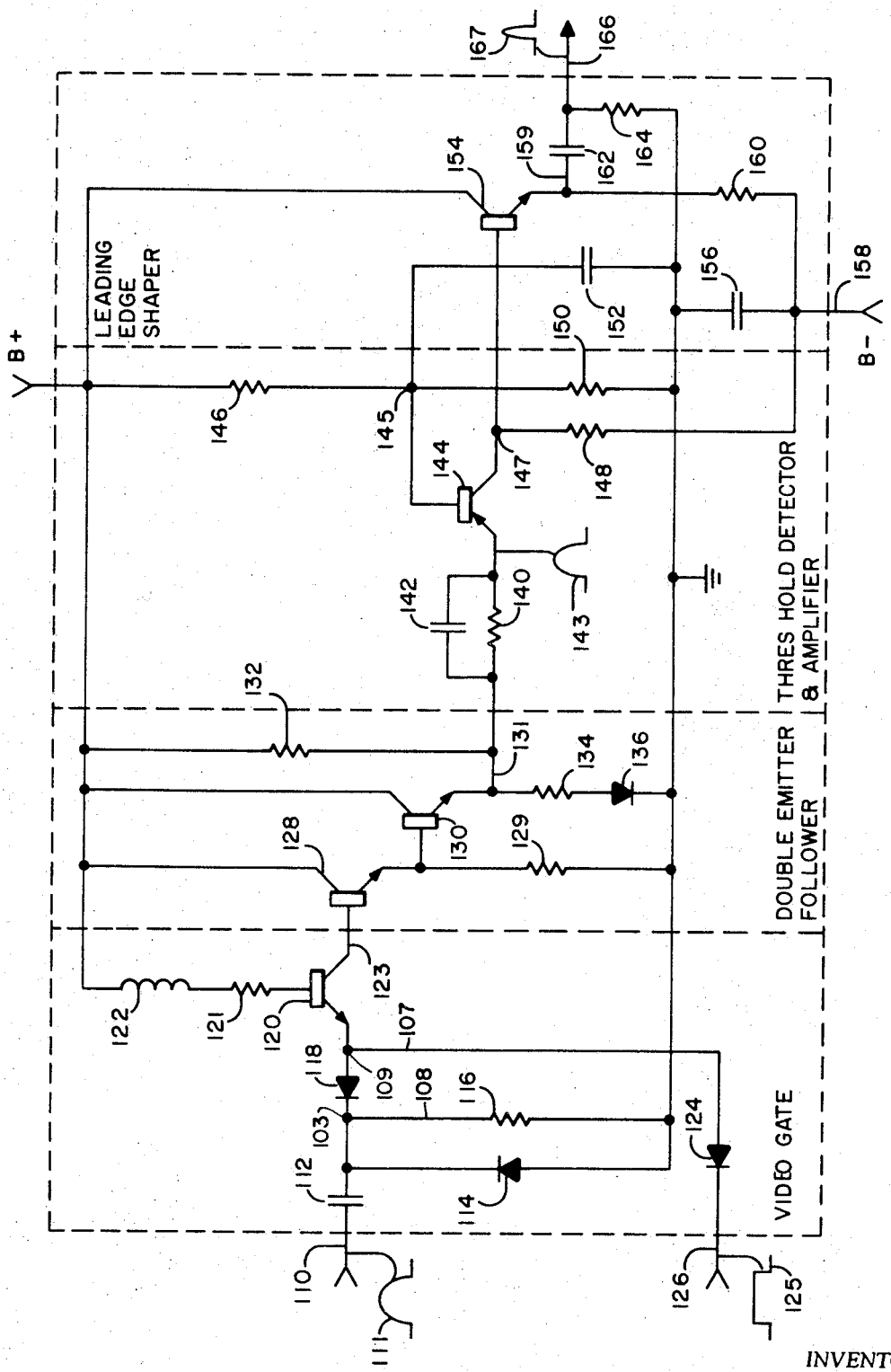

GATE INITIATED PULSE SHAPING CIRCUIT

BACKGROUND OF THE INVENTION

Radar altimeters usually employ a short-pulse radar signal to measure altitudes by measuring the time difference between the transmitted pulse and the returned video echo pulse. A pulse train, varying in width only, is generated from the time difference between the transmitted pulse and the ground returned video pulse. The radar altimeter circuitry then processes this pulse train into direct current voltages proportional in magnitude to altitude.

The primary application for radar altimeters in general is measuring altitudes at low altitudes to ground level. However some radar altimeter circuits have intentionally built in time delays that, because of the very short time intervals involved, for example in the order of a few nanoseconds, make it difficult for the radar altimeter to accurately measure altitude at low levels. Yet it is often necessary to employ delay lines because of the difficulty involved in developing circuits having sufficiently high-speed characteristics to permit accurate operation without the built in time delay. Also radar altimeter circuits often have large power requirements and their outputs are subject to error in varying temperature environments. Further, noise and spurious signals picked up in the circuits can lead to erroneous altitude readings.

Accordingly it has been found advantageous to have a circuit in a radar altimeter that receives and processes the video echo pulse without a delay line and with a minimum inherent constant time delay, and that gates a pulse in response to the video echo pulse only during a very short time period corresponding to the transmission and return time of the radar signal at the altitude being measured to minimize the effect of noise and spurious signals.

SUMMARY OF THE INVENTION

The circuit of this invention has particular application in radar altimeters and receives the video echo pulse of the radar return at a gate circuit in coordination with a gate pulse that is time oriented relative to altitude. Thus, the video gate and processing circuitry is only operative during the short time interval that the gating pulse received from a known tracker circuitry is so oriented relative to altitude that the time of the gating pulse brackets the time in which the return video pulse is received. At other times the video gate is closed and the processing circuitry is in a substantially deenergized condition and does not draw appreciable power. This reduces the power requirements and reduces the time in which noise and spurious signals pass from the video gate in response to the video echo pulse. The time interval of the gating pulse from the tracker may be, for example, in the order of 150 nanoseconds.

It is therefor an object of this invention to provide a new and improved gated pulse shaping circuit.

It is another object of this invention to provide a new and improved gated pulse shaping circuit for use in radar altimeters.

It is another object of this invention to provide a new and improved gated pulse shaping circuit that provides a minimum time delay that is constant relative to time and changes in temperature and that does not deteriorate the magnitude of the video echo pulse.

It is another object of this invention to provide a new and improved gated pulse shaping circuit for use in radar altimeters that do not have delay lines.

It is another object of this invention to provide a new and improved gated pulse shaping circuit that aids a radar altimeter to accurately read altitudes down to ground zero.

Other objects and many advantages of my invention will become more apparent upon a reading of the following detailed specification and in viewing the drawings.

The circuit of this invention generally comprises a video gate that gates a pulse in response to the video echo pulse of a radar return on coincidence with a signal from a tracker circuit (not shown). The tracker circuit is a well known circuit that provides a coincidence gating pulse for opening the video gate for a particular time interval corresponding to a given altitude. This limits the time the video gate is opened and thus reduces the possibility of noise and extraneous or spurious signal interference entering the circuit. The video gate upon simultaneously receiving the video echo pulse and the tracker circuit gating pulse provides a gated output pulse from a power supply to a double emitter follower circuit that provides a low impedance signal to the threshold detector and exactly repeats the voltage amplitude of the input video signal. The threshold detector and amplifier circuit provides an output signal, when the input signal passes through a given magnitude level, and amplifies the signal which is fed to the leading edge shaper that generally comprises an emitter follower circuit with a differentiating RC circuit that gives the output pulse a spike waveform.

In the embodiment of the circuit, the video echo pulse 111 is received by line 110 and fed through DC current blocking capacitor 112 to unidirectional device 118. The unidirectional device 114 protects against negative signals being received and processed and resistor 116 provides a return to ground for DC signals. Unidirectional devices 118 and 124 form the AND gate with transistor 120. Transistor gate 120 upon receiving a video signal from line 110 and a gating signal from the tracker through line 126 and unidirectional device 124, energizes and functions as a biswitch. The biswitch transistor 120 is connected to the B+ supply and switches the B+ current from its emitter to its collector or vice versa very rapidly to provide a minimum time delay that might otherwise occur through a normal storage and delay time circuit. In operation, transistor 120 normally conducts current from the B+ power supply to point 109 and either through line 107 and line 126 to ground in the input of the tracker gating signal circuit or through unidirectional device 118 and line 108 to ground. This provides a given first voltage at point 109. There is also a second voltage in line 123, but this latter voltage is not sufficient to fire the transistor 128. When the gating signal 125 is fed to line 126, its magnitude is sufficient to block the current path from transistor 120 through 107. Then when video pulse 111 is impressed on line 110, it causes a voltage rise at point 103 that increases to a magnitude that blocks current flow through unidirectional device 118. This causes an increase in the voltage level in line 123 to a magnitude that fires transistor 128. The voltage in line 123 is proportional with the voltage magnitude of video pulse 111 after the threshold level has been reached. By setting the parameters of the circuit, the magnitude of pulse 143 is equal to the magnitude of pulse 111. Inductance 122 and resistor 121 provide a high AC impedance to the B+ supply. The biswitch transistor 120 upon receiving a coincidence voltage level through lines 110 and 126 directs current through line 123 to the base of the transistor 128 turning on transistor 128. Transistors 128 and 130 form a double emitter follower circuit that provides a low impedance characteristic signal output with virtually no loss of signal amplitude. Resistor 129 provides a return to ground and maintains the two transistors 128 and 130 in optimum beta range. Thus, the output of the double emitter follower provides a signal to line 131 that has the same level of amplitude as the video echo pulse applied to line 110. Resistor 132 provides a low current path for current flow from the B+ supply through resistor 134 and unidirectional device 136 to ground. This voltage divider eliminates turn-on delays of the diode 136 and provides more speed of operation of the circuit. The parallel connected speed up capacitor 142 and current limiter resistor 140 provides a low impedance for the AC signal 143 that is applied to the high speed transistor 144, that is used in grounded base configuration. Transistor 144 is normally deenergized and is not turned on until the voltage in the pulse received from line 131 exceeds its threshold voltage. Resistor 148 provides a load for the transistor 144 to a negative power supply. The negative power supply connected across to the positive power supply increases signal amplitude capability of the transistor 144. Resistors 146 and 150 comprise a voltage divider that provides the threshold detector circuit with a reference level of voltage and capacitor 152 provides a power reservoir or reference level of voltage with a low power loss. The latter is very advantageous because of the very short pulse time relative to the long time between pulses. Transistor 154 also functions as an emitter follower circuit and receives the pulse through line 147 and provides an output signal to line 159 that is differentiated by the capacitor 162 and resistor 164 forming the RC differentiating network. Capacitor 162 also functions as a DC blocking capacitor and resistor 160 is the load for transistor 154. The signal is differentiated by the aforesaid differentiating circuit providing an output pulse 167 to line output 166 having a very narrow spike shape in the order of, for example, 10 nanoseconds in width.

IN OPERATION

When a video echo pulse is received by line 110 in coincidence with a gating pulse received from the tracker that is applied to line 126, these two pulses at AND gate diodes 118 and 124 and provide an increased voltage level to point 109 of transistor 120. Transistor 120 is a biswitch that in the second condition passes current to line 123 energizing transistor 128 and 130 that function as a double emitter follower to provide an output signal in line 131 having substantially the same magnitude as the input video pulse 110. The video gate and double emitter follower, through the rapid operating circuitry illustrated, provide a high speed gating of the input video pulse without reducing its magnitude or creating appreciable time delays. The signal 143 then energizes transistor 144 that in cooperation with the voltage divider formed by resistors 146 and 150 has a threshold level that when exceeded causes transistor 144 to provide an output pulse. The output pulse is applied to the base of transistor 154 providing an output signal to the RC circuit of capacitor 162 and resistor 164 which provide the narrow spike output pulse 167 in line 166.

Thus, this circuit has the purpose of providing a minimum time delay in processing the pulse while permitting a gating of the received video echo radar pulse to reduce noise and interference. The circuit provides a constant minimum time delay and has very low power requirements, since the circuit is normally in the deenergized condition. Further the video pulse 111 is not deteriorated in passing through the gating circuit and being shaped to the spike output signal 167.

I claim:
1. A gate initiated pulse shaping circuit for gating an output pulse in coincidence with a video pulse and a gating pulse and shaping the output pulse comprising:
   video gate means for receiving said video pulse and said gating pulse in coincidence and gating an output pulse from a power supply;
   double emitter follower means responsive to said output pulse for providing an output having low impedance characteristics and having a voltage amplitude substantially equal to said input pulse;
   threshold detector means responsive to said output from said emitter follower means having a given amplitude for providing an output signal; and shaper means responsive to said output signal for providing a spike-shaped pulse.

2. A gate initiated pulse shaping circuit according to claim 1 including, biswitch means for switching a current from said power supply to said double emitter follower means upon said video pulse and said gating pulse being impressed upon said video gate means.

3. A gate initiated pulse shaping circuit according to claim 1 in which, said threshold detector means includes amplified means for amplifying said output.

4. A gated pulse shaping circuit according to claim 1 in which, said shaper means comprising an emitter follower circuit and a differentiating circuit means for differentiating the output of said emitter follower circuit.

5. A gated pulse shaping circuit according to claim 1 in which, said threshold detector means includes a transistor with its base connected to a voltage divider circuit for detecting when the level said output exceeds a given magnitude.

6. A gate initiated pulse shaping circuit according to claim 2 in which, said biswitch means comprises a transistor with a base connected through an inductance to a power supply and the emitter and collector being connected between a junction of input lines for carrying said video pulse and said gating pulse and said double emitter follower means.

7. A gate initiated pulse shaping circuit according to claim 6 including, each of said input lines having unidirectional means adjacent said junction for preventing direct conduction of said video pulse and gating pulse to said transistor.

8. A gated pulse shaping circuit according to claim 3 in which, said amplifier means being connected between positive and negative power supplies.